United States Patent
Okamoto

(10) Patent No.: US 8,477,585 B2
(45) Date of Patent: Jul. 2, 2013

(54) OPTICAL PICKUP

(75) Inventor: Kenji Okamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/291,246

(22) Filed: Nov. 8, 2011

(65) Prior Publication Data

US 2012/0281518 A1    Nov. 8, 2012

(30) Foreign Application Priority Data

Nov. 9, 2010   (JP) .................. 2010-251149

(51) Int. Cl.
*G11B 7/12*    (2012.01)
(52) U.S. Cl.
USPC ..................... 369/112.23; 369/94
(58) Field of Classification Search
None
See application file for complete search history.

(56) References Cited

U.S. PATENT DOCUMENTS

2009/0052305 A1    2/2009    Koreeda et al.

FOREIGN PATENT DOCUMENTS

| EP | 1 304 689 A2 | 4/2003 |
|---|---|---|
| EP | 1 313 095 A2 | 5/2003 |
| EP | 1 471 514 A2 | 10/2004 |
| JP | 2009-070545 | 4/2009 |
| JP | 2009-116937 | 5/2009 |

OTHER PUBLICATIONS

Machine translation of JP2009-116937A into English; Utsuboya, "Pickup Device or the Like", May 28, 2009.*
Extended European Search Report dated Feb. 24, 2012 from corresponding EP Application No. 11188432.6.

* cited by examiner

*Primary Examiner* — Wayne Young
*Assistant Examiner* — Brian Butcher
(74) *Attorney, Agent, or Firm* — Morgan, Lewis & Bockius LLP

(57) ABSTRACT

An optical pickup has an objective lens that is shared for light of three wavelengths. The effective diameter of the light that passes through the objective lens decreases in a sequence of the light of a first wavelength (light for a first optical disk), the light of a second wavelength (light for a second optical disk) and the light of a third wavelength (light for a third optical disk); and the light of the third wavelength is incident on the objective lens in a finite system. The objective lens is provided so that the focal distance of the light of the second wavelength is greater than the focal distance of the light of the first wavelength.

5 Claims, 4 Drawing Sheets

OPTICAL PICKUP

This application is based on Japanese Patent Application No. 2010-251149 filed on Nov. 9, 2010, the contents of which are hereby incorporated by reference.

BACKGROUND OF THE INVENTION

1. Field of the Invention

The present invention relates to an optical pickup used when reading information recorded on an optical disk and writing information to an optical disk.

2. Description of Related Art

There are known in the prior art optical pickups capable of reading and writing information from and to Blu-Ray discs ("BDs"), digital versatile discs ("DVDs"), and compact discs ("CDs").

Some of these optical pickups are compatible with a plurality of types of optical disks such as BD, DVD, and CD using a single objective lens, as described in, e.g., Japanese Patent Application No. 2009-70545. Other optical pickups are provided with two types of objective lenses (e.g., a BD objective lens, and a DVD and CD objective lens) that are interchangeably used depending on the type of optical disk, as described in, e.g., Japanese Patent Application No. 2009-116937.

The objective lens referred to herein is a lens for focusing light emitted from a light source onto an information recording surface of an optical disk.

The use of a single objective lens is advantageous in terms of allowing the optical pickup to be made more compact, among other benefits. Over the past several years, techniques for fabricating objective lenses from plastic have been improved so that it is now possible to manufacture objective lenses configured so as to be capable of minimizing spherical aberration (lenses having a diffractive structure) even for use in BDs, DVDs, or CDs. In view of the above, there are rising expectations in the market for an optical pickup that is compatible with a plurality of types of optical disks such as BDs, DVDs, and CDs using a single objective lens.

SUMMARY OF THE INVENTION

Described below are issues in an optical pickup that is compatible with three types of optical disks, i.e., BDs, DVDs, and CDs, using a single objective lens (a lens having a diffractive structure). With this type of optical pickup, the effective diameter of the light that passes through the objective lens is typically different for BD laser light (e.g., light of the 405-nm wavelength band), DVD laser light (e.g., light of the 650-nm wavelength band), and CD laser light (e.g., light of the 780-nm wavelength band). The effective diameter decreases in the order of BD laser light, DVD laser light, and CD laser light, as shown in FIG. 5.

Since the effective diameter of the CD laser light is quite small, the focal distance of CD laser light is generally very short. Accordingly, in the case that no countermeasure is taken, the working distance (WD) is considerably reduced for CD compatibility, increasing the possibility of a collision between the optical disk and the objective lens. Working distance refers to the distance from the surface of the optical disk on which light is incident to the objective lens in a state where the objective lens is operating to read information recorded on the optical disk and to write information to the optical disk.

For this reason, it is preferred that laser light not be made incident on the objective lens 100 in an infinite system (the configuration shown by the broken line in FIG. 6), but rather be made incident in a finite system (the configuration shown by the solid line in FIG. 6; here, the incidence of divergent light) in order to ensure the WD for CD laser light. In this case, the portion of the objective lens 100 within the effective diameter of the CD laser light is designed to be compatible with a finite system. The focal distance of the CD laser light is thereby extended and the WD can be set to a sufficient length.

Incidence in an infinite system refers to a configuration in which parallel light is made incident on the objective lens 100, and incidence in a finite system refers to a configuration in which divergent light or convergent light is made incident on the objective lens 100.

However, in the case that such a configuration is used, DVD laser light, whose effective diameter is relatively close to that of CD laser light, is impacted by the design of the objective lens modified for CD compatibility, so that the focal distance increases. The focal distance of DVD laser light and the focal distance of BD laser light may end up being very similar. BD laser light has a considerably larger effective diameter than CD laser light, and is not liable to be impacted by the design of an objective lens modified for CD compatibility.

The present inventor uses an S-shaped linear range in an S curve of a focus error signal as an index of optical pickup performance. Here, the S curve of the focus error signal is an S-shaped signal curve of the focus error signal obtained by moving the objective lens toward or away from the optical disk. The S-shaped linear range refers to the distance that the objective lens is moved from a local minimum (or a local maximum) of the S-shape curve to a local maximum (or local minimum), as shown in FIG. 7. The S-shaped linear range is intimately related to the defocusing performance and photodetector (PD) offset sensitivity of the optical pickup, and constitutes one performance index of an optical pickup.

The S-shaped linear range has different optimal settings depending on the type of optical disk; and in terms of a comparison of BD compatibility and DVD compatibility, the range is preferably shorter in the case of BD compatibility and longer in the case of DVD compatibility. In this regard, it is difficult to ensure a suitable S-shaped linear range for both BD compatibility and DVD compatibility when the focal distance of the DVD laser light and the focal distance of the BD laser light are similar. As a result, performance (read performance and the like) cannot be sufficiently ensured in the case of at least one of BD compatibility and DVD compatibility.

With the foregoing in view, it is an object of the present invention to ensure sufficient performance in an optical pickup that is compatible with three wavelengths of light using a single objective lens for cases in which any of the wavelengths of light is used.

In order to achieve the objects described above, the optical pickup of the present invention is an optical pickup compatible with a first optical disk, a second optical disk, and a third optical disk that are used by irradiating light of mutually different wavelengths, the optical pickup comprising: a first light source for emitting light of a first wavelength that is used for the first optical disk, the light of the first wavelength being a shortest wavelength; a second light source for emitting light of a second wavelength that is used for the second optical disk, the light of the second wavelength being an intermediate wavelength; a third light source for emitting light of a third wavelength that is used for the third optical disk, the light of the third wavelength being a longest wavelength; a shared-use objective lens for focusing light emitted from the light sources onto an information recording surface of the optical disks; a collimating lens arranged in an optical path that is shared when light emitted from the light sources arrives at the objective lens; and a shared-use photodetector for receiving light reflected by the optical disks; wherein the effective diameter of light that passes through the objective lens decreases in the order of the light of the first wavelength, the light of the second wavelength, and the light of the third wavelength, the light of the third wavelength is incident on the objective lens in a finite system, and the objective lens is provided so that the focal distance of the light of the second wavelength is greater than the focal distance of the light of the first wavelength.

According to the aspect described above, the light of the third wavelength having a small effective diameter is made incident on the objective lens in a finite system. Accordingly, the focal distance of the light of the third wavelength is increased and the working distance (WD) can be sufficiently ensured in the case of compatibility with the third optical disk. Excellent performance (reading and writing performance) can be ensured in the cases of the first optical disk and the second optical disk because the objective lens is configured so that the focal distance of the light of the second wavelength is greater (longer) than the focal distance of the light of the first wavelength.

In the optical pickup of the aspect described above, the collimating lens is preferably capable of moving in the direction of an optical axis. In accordance with this configuration, the effect of spherical aberration can be minimized and excellent performance can be ensured even in the case of compatibility with a multilayer disk.

In the optical pickup of the configuration described above, the following expression (1) is preferably satisfied:

$$fD - fB \geq fB \times 0.2 \quad (1)$$

where fB is the focal distance of the light of the first wavelength, and fD is the focal distance of the light of the second wavelength.

The present aspect is advantageous in the case that the first optical disk is a BD, the second optical disk is a DVD, and the third optical disk is a CD.

In the optical pickup of the configuration described above, the light of the second wavelength may be incident on the objective lens in a finite system. In accordance with the present aspect, a configuration in which the focal distance of the light of the second wavelength is greater than the focal distance of the light of the first wavelength is readily implemented.

In the optical pickup of the configuration described above, it is acceptable for the first optical disk to be a BD, the second optical disk to be a DVD, and the third optical disk to be a CD.

In accordance with the present invention, an optical pickup that is compatible with three wavelengths of light using a single objective lens is capable of ensuring sufficient performance when any of the wavelengths of light is used. The present invention is of prominent utility in the case that the size of the optical pickup is to be reduced.

DETAILED DESCRIPTION OF PREFERRED EMBODIMENTS

Embodiments of the optical pickup of the present invention are described in detail below with reference to the accompanying drawings. The optical pickup of the present embodiment is provided so as to be compatible with (capable of reading information from and/or writing information to) three types of optical disk: BDs, DVDs, and CDs. BDs are an example of the first optical disk of the present invention, DVDs are an example of the second optical disk of the present invention, and CDs are an example of the third optical disk of the present invention.

Figure 1A:
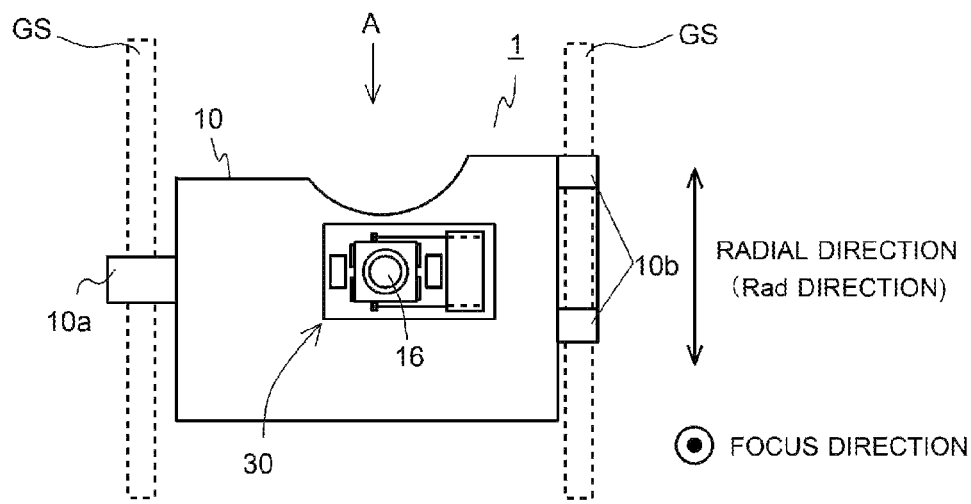
FIG. 1A is a schematic top view showing the configuration of the optical pickup of the present embodiment.
Figure 1B:
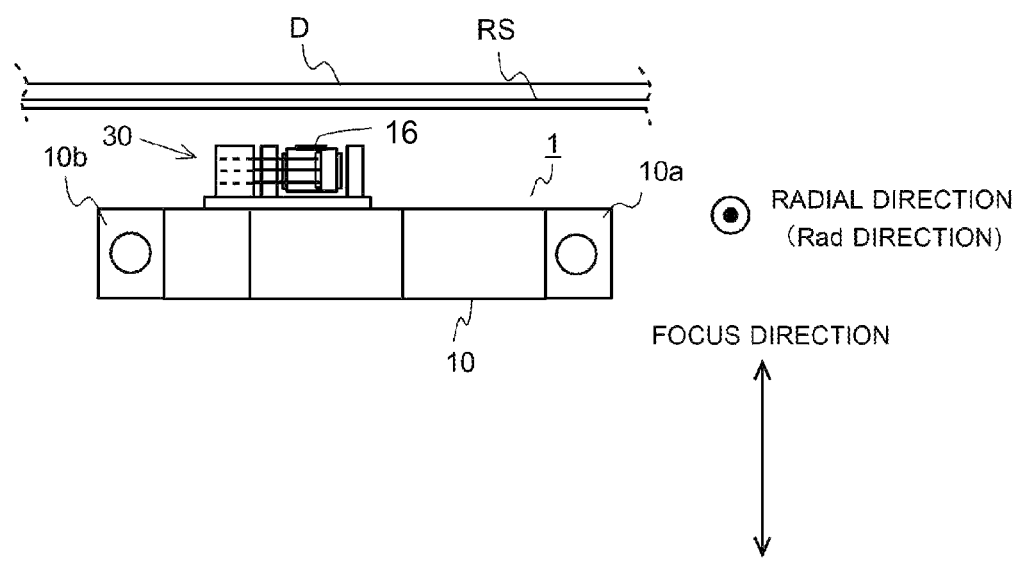
FIG. 1B is a schematic side view showing the configuration of the optical pickup of the present embodiment.

FIGS. 1A and 1B are schematic plan views showing the configuration of the optical pickup of the present embodiment, wherein FIG. 1A is a top view of the optical pickup, and FIG. 1B is a side view of the optical pickup. FIG. 1B is a view along arrow A shown in FIG. 1A. FIG. 1B also shows an optical disk D in order to facilitate understanding.

An optical pickup 1 of the present embodiment is provided with a pickup base 10, and an objective lens actuator 30 securely arranged on the pickup base 10, as shown in FIGS. 1A and 1B.

Bearing units 10a, 10b are provided to the left and right end parts of the pickup base 10. The pickup base 10 is slidably supported by the bearing units 10a, 10b on guide shafts GS (indicated by a broken line in FIG. 1A) provided to an optical disk device (a device for playing the optical disk D or recording thereon). The guide shafts GS provided to the optical pickup device are arranged so as to extend in the radial direction (Rad direction). The optical pickup 1, which is capable of sliding on the guide shafts GS, can access a desired address on the rotating optical disk D to read and write information.

The objective lens actuator 30 is a device allowing an objective lens 16 provided to the optical system of the optical pickup 1 to move in the focus direction and the tracking direction. The focus direction is the direction perpendicular to the information recording surface RS of the optical disk D, and the tracking direction is the direction parallel to the radial direction (Rad direction) of the optical disk D.

In the optical pickup 1, focusing control must be carried out so that the focal position of the objective lens 16 conforms to the information recording surface RS of the optical disk D when information is to be read and/or written. Furthermore, in the optical pickup 1, tracking control must be carried out so that the position of the light spot focused on the information recording surface RS of the optical disk D by the objective lens 16 follows the tracks of the optical disk D when information is to be read and/or written. The objective lens actuator 30 allows these focusing and tracking controls to be carried out, and during these control operations, the objective lens 16 is suitably moved in the focus direction and the tracking direction.

The objective lens actuator 30 has a lens holder for holding the objective lens 16, and is configured to swingably support the lens holder using a wire. Such objective lens actuators are well-known, and thus shall not be described in detail herein. Also, the objective lens actuator 30 may also have a tilt function for adjusting the tilt of the objective lens 16 with respect to the optical axis.

Figure 2:
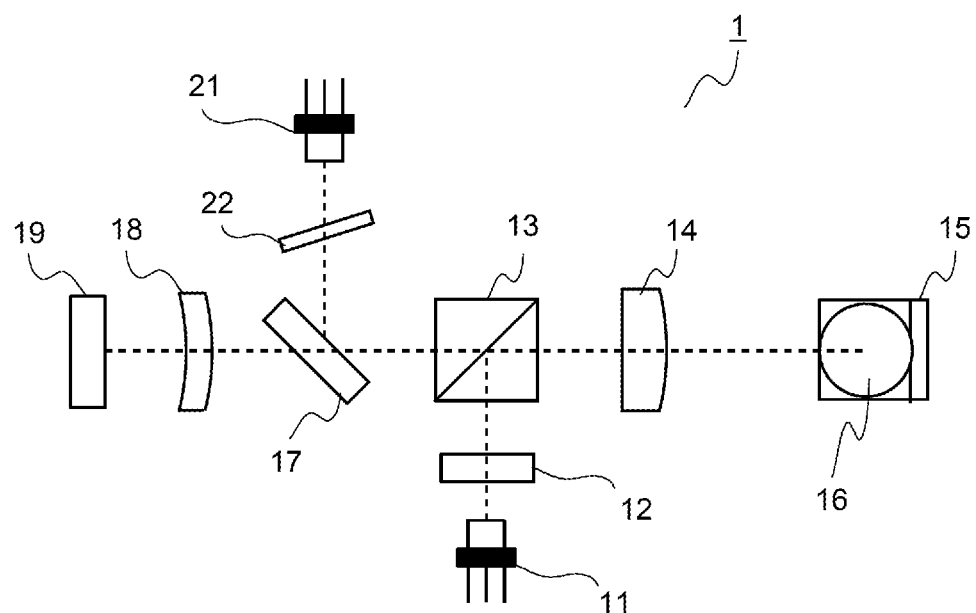
FIG. 2 is a schematic plan view showing the optical configuration of the optical pickup of the present embodiment.

FIG. 2 is a schematic plan view showing the optical configuration of the optical pickup of the present embodiment. A first semiconductor laser 11 is capable of emitting BD laser light (which, in the present embodiment, laser light of the 405-nm wavelength band; i.e., an example of the light of a first wavelength of the present invention). The first semiconductor laser 11 is a light source for emitting light of a single wavelength, and is an example of the first light source of the present invention.

The laser light emitted from the first semiconductor laser 11 is divided into a main beam and two sub beams by a diffraction element 12 so that a tracking error (TE) signal can be obtained by the differential push-pull (DPP) technique, which is well-known. The laser light, which has arrived at a first beam splitter 13 from the diffraction element 12 and been reflected by the first beam splitter 13, is transmitted through a collimating lens 14, and is reflected by a rising mirror 15. The laser light reflected by the rising mirror 15 arrives at the objective lens 16, which is located above the rising mirror 15. The objective lens 16 has a function for focusing incident laser light on the information recording surface RS of the optical disk D (see FIG. 1B).

The laser light focused on the information recording surface RS by the objective lens 16 is reflected by the information recording surface RS. The reflected light (returned light) passes through the objective lens 16, and is subsequently reflected off the rising mirror 15 before being transmitted through the collimating lens 14, the first beam splitter 13, and a second beam splitter 17 in the stated order. The light is imparted with astigmatism by a sensor lens 18 having a cylindrical surface, and is focused on a photodetector 19 (an example of the photodetector of the present invention). Astigmatism is imparted by the sensor lens 18 in order to make it possible to obtain a focus error (FE) signal using the astigmatic method, which is a well-known technique.

The photodetector 19 functions as photoelectric conversion means for converting the received optical signal into an electric signal. The electric signal outputted from the photodetector 19 is sent to a signal processing unit (not shown), whereupon a replay signal, an FE signal, a TE signal, and the like are generated. The controller (not shown) of the optical pickup 1 controls driving of the objective lens actuator 30 on the basis of the FE signal and TE signal generated by the signal processing unit in order to carry out focusing control and tracking control.

A second semiconductor laser 21 is a two-wavelength laser, and has a light-emitting point for emitting DVD laser light (in the present embodiment, laser light of the 650-nm wavelength band; an example of the light of a second wavelength of the present invention); and a light-emitting point for emitting CD laser light (in the present embodiment, laser light of the 780-nm wavelength band; an example of the light of a third wavelength of the present invention). The light-emitting point for emitting DVD laser light is an example of the second light source of the present invention; and the light-emitting point for emitting CD laser light is an example of the third light source of the present invention. The second semiconductor laser 21 is capable of switching between emitting DVD laser light and emitting CD laser light. Such a two-wavelength laser may be, e.g., a monolithic-type two-wavelength laser or a hybrid-type two-wavelength laser.

The laser light emitted from the second semiconductor laser 21 is imparted with astigmatism by a flat plate glass 22 arranged with its plate surface sloped in relation to the optical axis. The flat plate glass 22 is arranged for the purpose of correcting the astigmatism of the second semiconductor laser 21 (the astigmatism generated in the laser light emitted from the second semiconductor laser 21), and the angle formed between the optical axis and the plate surface of the flat plate glass 22 is suitably set in a range of greater than 0° and less than 90°.

The portion of laser light reflected by the second beam splitter 17 of the laser light emitted from the flat plate glass 22 passes through the first beam splitter 13 and the collimating lens 14. The light is thereafter reflected by the rising mirror 15, before arriving at the objective lens 16 above the rising mirror 15. The reflected light (returned light) reflected after having been focused on the information recording surface RS by the objective lens 16 arrives at the photodetector 19 by the same pathway as that of laser light emitted from the first semiconductor laser 11.

As described above, in the optical pickup 1, the collimating lens 14, the objective lens 16, and the photodetector 19 are shared optical members that are used for achieving compatibility with BD, DVD, and CD optical disks D (reading information and writing information).

The collimating lens 14 is preferably capable of moving in the direction of the optical axis (the left/right direction in FIG. 2). Aberration (mainly spherical aberration) in relation to a multilayer optical disk is thereby inhibited and information can be read and written. The first beam splitter 13 is preferably a polarized beam splitter. In this case, a ¼ wavelength plate is preferably arranged in the optical path between the first beam splitter 13 and the objective lens 16.

Figure 3:
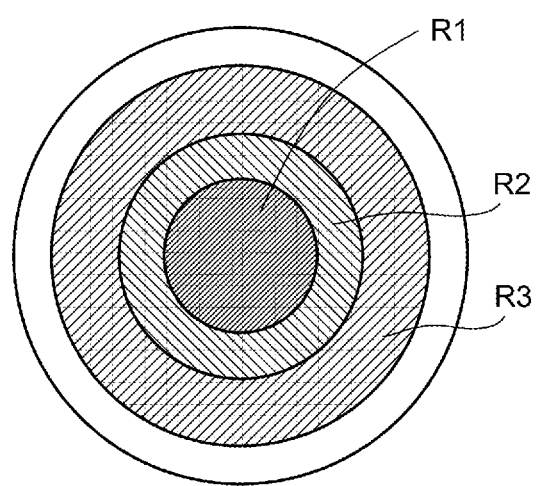
FIG. 3 is a schematic view showing the objective lens provided to the optical pickup of the present embodiment as viewed along the optical axis direction.
Figure 5:
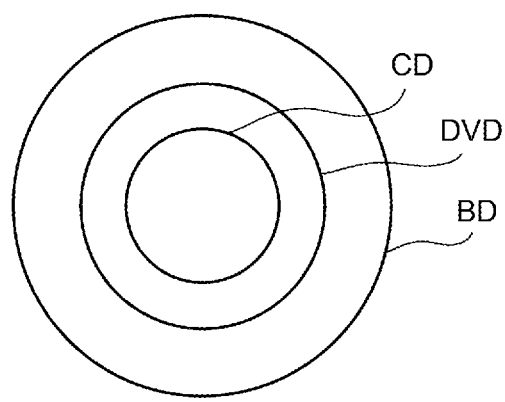
FIG. 5 is a schematic diagram for describing the effective diameter of the light that passes through the objective lens in an optical pickup that is BD-, DVD-, and CD-compatible using a single objective lens.
Figure 6:
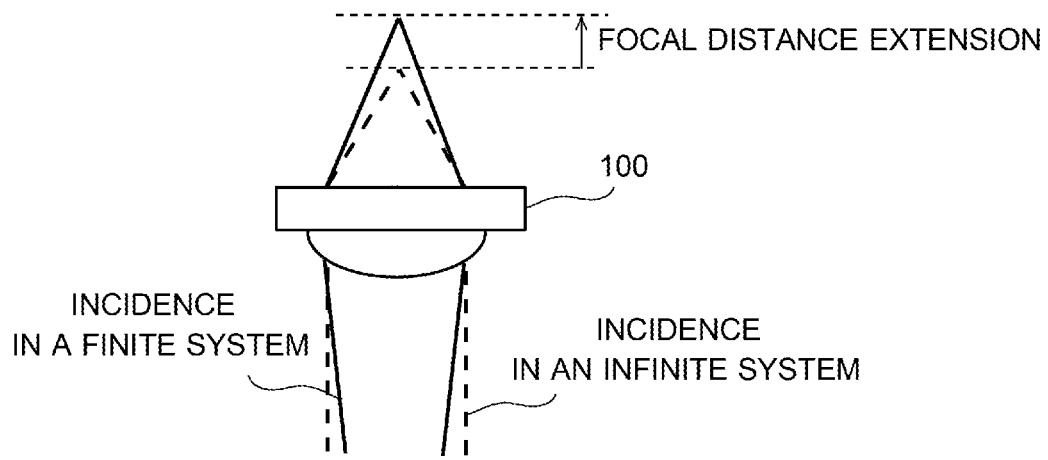
FIG. 6 is a schematic diagram for describing the case in which laser light is made incident on the objective lens in a finite system and in an infinite system.
Figure 7:
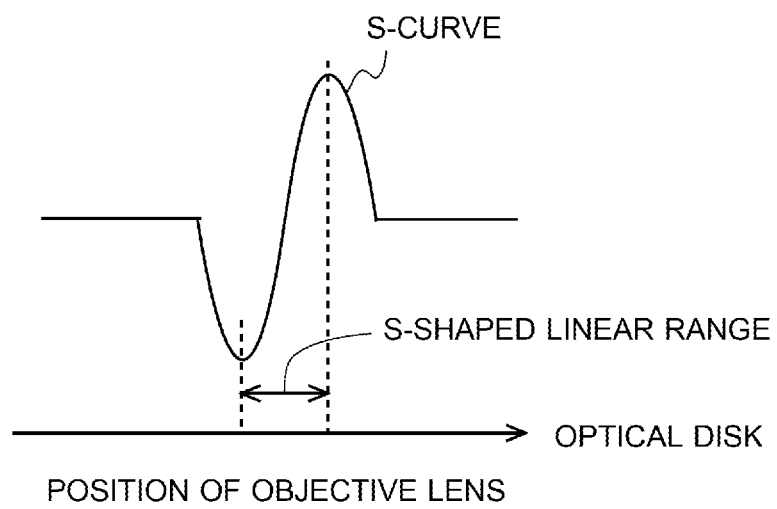
FIG. 7 is a schematic view for describing the S-shaped linear range.

The effective diameter of the laser light that passes through the objective lens 16 decreases in the order of the BD laser light, the DVD laser light, and the CD laser light, as in FIG. 5 described above. The objective lens 16 constituted as a diffractive lens is configured having three divided regions of different design, as shown in FIG. 3, in order to be compatible with differences in the effective diameter. FIG. 3 is a schematic view of the case in which the objective lens provided to the optical pickup of the present embodiment is viewed along the optical axis direction. A first region R1 is a region inside the effective diameter of the CD laser light. A second region R2 is a region outside of the first region R1 and inside the effective diameter of the DVD laser light. A third region R3 is a region outside of the second region R2 and inside the effective diameter of the BD laser light.

In the optical pickup 1 of the present embodiment, the CD laser light emitted from the collimating lens 14 is divergent light so that the focal distance of the CD laser light can be extended. The first region R1 in the objective lens 16 (see FIG. 3) is designed so as to be compatible therewith.

In the case that such a configuration is used, the focal distance of the BD laser light and the focal distance of the DVD laser light are proximate, as described above, and becomes harder to ensure sufficient performance for BD compatibility and DVD compatibility. The objective lens 16 of the present embodiment is configured to be capable of solving this problem.

In other words, the objective lens 16 is designed so that the focal distance of the DVD laser light is greater than the focal distance of the BD laser light. More specifically, the objective lens 16 is designed so that the focal distance (fD) of the DVD laser light and the focal distance (fB) of the BD laser light satisfy the following expression (1).

$$fD - fB \geq fB \times 0.2 \quad (1)$$

Such a condition can be satisfied by, e.g., reviewing the distribution between the DVD laser light and the BD laser light in terms of the effective diameter in the objective lens 16, and modifying the design of the objective lens 16 in compatibility therewith. For example, expression (1) can also be satisfied by using divergent light as the DVD laser light emitted from the collimating lens 14 in similar fashion to CD laser light, and modifying the design of the objective lens 16 in compatibility therewith. For example, the two combinations described above may also be used to satisfy the expression (1) above.

Figure 4:
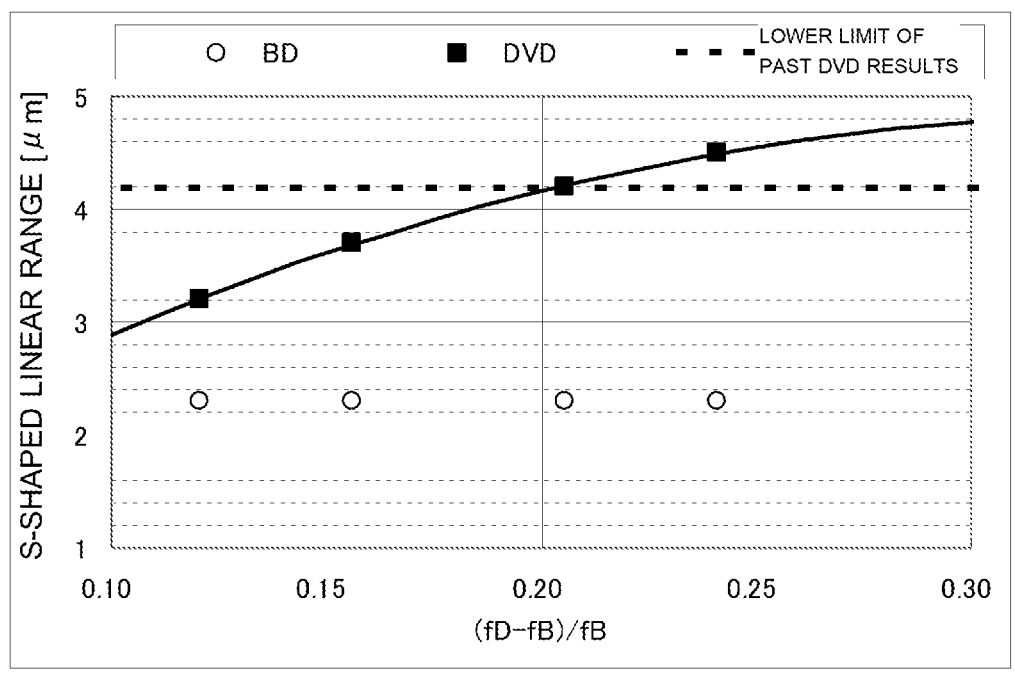
FIG. 4 is a graph based on the results shown in Table 1.

Described below is a reason that the objective lens 16 can be designed so as to satisfy expression (1). Table 1 shown below contains the results of a design modification simulation in which the focal distance of the DVD laser light in the optical pickup 1 of the present embodiment was changed. FIG. 4 is a graph based on the results shown in Table 1. In FIG. 4, the horizontal axis shows values obtained by dividing the difference between the focal distance (fD) of the DVD laser light and the focal distance (fB) of the BD laser light by the focal distance (fB) of the BD laser light; and the vertical axis shows the S-shaped linear range.

TABLE 1

| FB [mm] | fD [mm] | fD − fB [mm] | (fD − fB)/fB | S-shaped linear range (BD) [μm] | S-shaped linear range (DVD) [μm] |
|---|---|---|---|---|---|
| 1.41 | 1.75 | 0.34 | 0.24 | 2.3 | 4.5 |
| 1.41 | 1.70 | 0.29 | 0.21 | 2.3 | 4.2 |
| 1.41 | 1.63 | 0.22 | 0.16 | 2.3 | 3.7 |
| 1.41 | 1.58 | 0.17 | 0.12 | 2.3 | 3.2 |

The optical system of the optical pickup used in the simulation was the optical system shown in FIG. 2 described above. The simulation results are the results of the case in which the focal distance of the collimating lens 14 was 12 mm. In the case that the focal distance of the collimating lens 14 is modified, it is necessary, e.g., to modify the design of the sensor lens 18 in association with the change in optical magnification; however, the similar results to the results shown in FIG. 4 are obtained.

BD includes multilayer disks (two-layer disks, four-layer disks, and the like). In consideration of this point, the optical pickup 1 is configured so that the position of the collimating lens 14 is varied and the convergent/divergent state of the laser light incident on the objective lens 16 is varied when the information recording surface to be read or otherwise used is different. The simulation assumed the case in which BD laser light is incident on the objective lens 16 in an infinite system (parallel light is incident). The position of the information recording surface of the BD during the simulation was taken to be a position set at a distance of 0.0875 mm from the surface of the disk (an intermediate position between a layer L0 and layer L1).

Furthermore, in the simulation, the objective lens 16 was designed so that the focal distance of the BD laser light was constant regardless of whether the focal distance of the DVD laser light was modified. The focal distance of the BD laser light was selected from past results so that the S-shaped linear range (which is the index of performance for reading or the like) was optimal. By "past results" is meant conditions in which good performance was obtained even for compatibility with a multilayer disk having four layers.

In the simulation, the DVD laser light was made incident on the objective lens 16 in a finite system. The design of the objective lens 16 (a finite system design) was modified and the focal distance of the DVD laser light was modified while the position of the collimating lens 14 was moved so as to modify the state of the laser light incident on the objective lens 16. The position of the information recording surface of the DVD during simulation was a position set at a distance of 0.6 mm from the disk surface.

The S-shaped linear range of the DVD laser light increases as the difference between the focal distance of the DVD laser light and the focal distance of the BD laser light increases, as shown in FIG. 4. It is apparent that when the value obtained by dividing the difference between the focal distance (fD) of the DVD laser light and the focal distance (fB) of the BD laser light by the focal distance (fB) of the BD laser light is 20% or higher, the S-shaped linear range is equal to or greater than the lower limit value at which performance can be ensured in a DVD. Accordingly, in the optical pickup 1, the objective lens 16 is designed so as to satisfy expression (1).

From a design perspective, performance for both DVD compatibility and BD compatibility can be ensured when the value obtained by dividing the difference between the focal distance (fD) of the DVD laser light and the focal distance (fB) of the BD laser light by the focal distance (fB) of the BD laser light is 20% or higher. However, when the difference between the focal distance (fD) of the DVD laser light and the focal distance (fB) of the BD laser light becomes excessively large, the objective lens actuator 30 cannot achieve both BD compatibility and DVD compatibility. Accordingly, the upper limit of the value obtained by dividing the difference between the focal distance (fD) of the DVD laser light and the focal distance (fB) of the BD laser light by the focal distance (fB) of the BD laser light is determined by, e.g., the performance limit of the objective lens actuator 30.

The embodiment described above is merely one example of the present invention; the optical pickup of the present invention is not limited to the configuration described above.

For example, in the design of the objective lens 16 in the embodiment described above, a configuration is used in which the BD laser light is incident on the objective lens 16 in an infinite system, but a configuration may be used in which the BD laser light is incident on the objective lens 16 in a finite system. In the design of the objective lens 16 in the embodiment described above, a configuration is used in which the DVD laser light is incident on the objective lens 16 in a finite system, but a configuration may be used in which the DVD laser light is incident on the objective lens 16 in an infinite system.

In the embodiments described above, the optical pickup is configured to be compatible with three types of optical disks; i.e., BDs, DVDs, and CDs. However, no limitation is imposed thereby; the type of optical disk in the present invention can be suitably modified.

The present invention is advantageous as an optical pickup that is compatible with three types of optical disks; i.e., BDs, DVDs, and CDs.

What is claimed is:

1. An optical pickup compatible with a first optical disk, a second optical disk, and a third optical disk that are used by irradiating light of mutually different wavelengths, the optical pickup comprising:
   a first light source for emitting light of a first wavelength that is used for the first optical disk, the light of the first wavelength being a shortest wavelength;

a second light source for emitting light of a second wavelength that is used for the second optical disk, the light of the second wavelength being an intermediate wavelength;

a third light source for emitting light of a third wavelength that is used for the third optical disk, the light of the third wavelength being a longest wavelength;

a shared-use objective lens for focusing light emitted from the light sources onto an information recording surface of the optical disks;

a collimating lens arranged in an optical path that is shared when light emitted from the light sources arrives at the objective lens; and a shared-use photodetector for receiving light reflected by the optical disks; wherein the effective diameter of light that passes through the objective lens decreases in the order of the light of the first wavelength, the light of the second wavelength, and the light of the third wavelength;

the light of the third wavelength is incident on the objective lens in a finite system;

the objective lens is provided so that the focal distance of the light of the second wavelength is greater than the focal distance of the light of the first wavelength; and the following expression (1) is satisfied, $$fD - fB \geq fB \times 0.2 \qquad (1)$$

where fB is the focal distance of the light of the first wavelength, and fD is the focal distance of the light of the second wavelength.

2. The optical pickup of claim 1, wherein the collimating lens is capable of moving in the direction of an optical axis.

3. The optical pickup of claim 1, wherein the light of a second wavelength is incident on the objective lens in a finite system.

4. The optical pickup of claim 1, wherein the first optical disk is a BD, the second optical disk is a DVD, and the third optical disk is a CD.

5. An optical pickup compatible with a BD, a DVD, and a CD, the optical pickup comprising:

a first light source for emitting light of a first wavelength that is used for a BD;

a second light source for emitting light of a second wavelength that is used for a DVD;

a third light source for emitting light of a third wavelength that is used for a CD;

a shared-use objective lens for focusing light emitted from the light sources onto an information recording surface of the optical disks;

a collimating lens arranged in an optical path that is shared when light emitted from the light sources arrives at the objective lens, and provided so as to be capable of moving in the direction of an optical axis; and a shared-use photodetector for receiving light reflected by the optical disks; wherein the effective diameter of light that passes through the objective lens decreases in the order of the light of the first wavelength, the light of the second wavelength, and the light of the third wavelength, the light of a second wavelength and the light of a third wavelength are incident on the objective lens in a finite system, the objective lens is provided so that the focal distance of the light of a second wavelength is greater than the focal distance of the light of a first wavelength, and the following expression (1) is satisfied, $$fD - fB \geq fB \times 0.2 \qquad (1)$$

where fB is the focal distance of the light of the first wavelength, and fD is the focal distance of the light of the second wavelength.

* * * * *